US008374101B2

(12) United States Patent
Li et al.

(10) Patent No.: US 8,374,101 B2
(45) Date of Patent: Feb. 12, 2013

(54) MULTICAST WITH JOINT LAYER RESOURCE ALLOCATION IN BROADBAND WIRELESS NETWORKS

(75) Inventors: Peilong Li, Beijing (CN); Honghai Zhang, Ewing, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 382 days.

(21) Appl. No.: 12/846,158

(22) Filed: Jul. 29, 2010

(65) Prior Publication Data

US 2011/0064014 A1 Mar. 17, 2011

Related U.S. Application Data

(66) Substitute for application No. 61/229,999, filed on Jul. 30, 2009.

(51) Int. Cl.
*H04L 12/26* (2006.01)
*H04H 20/71* (2008.01)
*H04W 4/00* (2009.01)
*H04L 12/43* (2006.01)
*H04B 15/00* (2006.01)

(52) U.S. Cl. ........ 370/252; 370/312; 370/329; 370/458; 375/285; 375/296

(58) Field of Classification Search ........................ None
See application file for complete search history.

(56) References Cited

U.S. PATENT DOCUMENTS

| | | | |
|---|---|---|---|
| 6,963,544 B1 * | 11/2005 | Balachandran et al. | 370/281 |
| 6,996,083 B1 * | 2/2006 | Balachandran et al. | 370/337 |
| 7,006,477 B1 * | 2/2006 | Balachandran et al. | 370/337 |
| 2006/0187964 A1 * | 8/2006 | Li et al. | 370/474 |
| 2006/0268837 A1 * | 11/2006 | Larsson et al. | 370/352 |
| 2009/0103435 A1 * | 4/2009 | Celentano et al. | 370/232 |
| 2010/0265911 A1 * | 10/2010 | Wu et al. | 370/330 |
| 2010/0269142 A1 * | 10/2010 | Li et al. | 725/62 |

OTHER PUBLICATIONS

Deb, S., et al. "Real-Time Video Multicast in WiMAX Networks" INFOCOM 2008. 27th IEEE International Conference on Computer Communications, Joint Conference of the IEEE Computer and Communications Societies. Apr. 2008. pp. 2252-2260.

Kim, J., et al. "Resource Allocation for Scalable Video Broadcast in Wireless Cellular Networks" IEEE International Conference on Wireless and Mobile Computing, Networking and Communications (WiMob'2005). Aug. 2005. pp. 174-180.

Kuo, W., et al. "Utility-Based Resource Allocation for Layer-Encoded IPTV Multicast in IEEE 802.16 (WiMAX) Wireless Networks" Proceedings of IEEE International Conference on Communications, ICC 2007. Jun. 2007. pp. 1754-1759.

Li, P., et al. "Scalable Video Multicast in Multi-Carrier Wireless Data Systems" Proceedings of the 17th annual IEEE International Conference on Network Protocols, 2009. ICNP 2009. Oct. 2009. (10 Pages).

* cited by examiner

*Primary Examiner* — Clemence Han
(74) *Attorney, Agent, or Firm* — James Bitetto; Joseph Kolodka (57) ABSTRACT

Methods and systems for allocating resources and modulation and coding schemes to transmit layers of a data stream are described. Embodiments provide efficient utilization of resources by collectively allocating resource slots to layers assigned a common modulation and coding scheme. Modulation and coding schemes are assigned based on a maximal utility that is modeled on the collective resource allocation.

19 Claims, 5 Drawing Sheets

FIG. 5

MULTICAST WITH JOINT LAYER RESOURCE ALLOCATION IN BROADBAND WIRELESS NETWORKS

RELATED APPLICATION INFORMATION

This application claims priority to provisional application Ser. No. 61/229,999 filed on Jul. 30, 2009, incorporated herein by reference.

BACKGROUND

1. Technical Field

The present invention relates to multicasts and, in particular, assignment of resources and modulation and coding schemes to layers of multicast data streams.

2. Description of the Related Art

Next generation cellular wireless networks, such as 4G, are expected to deliver a much higher spectrum efficiency and bandwidth than existing networks. The International Telecommunication Union (ITU) requires that 4G technology should provide peak data rate of 100 Mbps for high mobility applications and 1 Gbps for low mobility applications. Such a high bandwidth enables the provision of real-time video services, such as Internet Protocol Television (IPTV) services, live video streaming and online telecast of sports.

Nevertheless, due to the fact that the available wireless spectrum is typically shared by many users and that each streaming video service may have very large bandwidth and stringent delay requirements, efficient resource allocation is an important aspect in developing cellular wireless network technology.

Adaptive modulation and coding schemes are currently used in wireless networks to provide efficient resource allocation. Here, the transmitters, such as base stations providing video streaming services, can adaptively select the modulation and coding scheme (MCS) to be applied when transmitting data to receivers. In particular, the MCSs employed can be receiver-specific in that they are based on different channel qualities measured at a receiver and on different receiver device capabilities. However, in wireless multicast services, the receivers can have fading channel conditions, various instantaneous channel conditions due to their different respective distances from the base station, etc. Adaptive modulation and coding schemes enable the determination of which MCS should be used for a multicast frame. Normally, a robust modulation and coding scheme that is receivable by all wireless clients in the multicast group is typically employed to accommodate all receivers. As a result, the multicast data rate and video quality are limited by the users with the worst channel conditions.

To address this limitation in a wireless video multicast scenario, scalable video coding (SVC) schemes have been developed. Scalable video coding schemes divide a video stream into multiple sub-streams, denoted as layers. An SVC stream has one base layer and one or multiple enhancement layers. The base layer provides a minimum quality, frame rate and resolution of the video and the enhancement layers represent the same video at gradually increasing quality and/or frame rate and/or resolution. Therefore, by applying different MCSs on different layers of the scalable video sequence, essential video service can be provided to all the users via the base layer with a low rate MCS while the enhancement layers with a high rate MCS can help improve the video quality for the users having good channel conditions.

While scalable video coding provides flexibility and high performance, scalable video coding also presents great challenges in designing an efficient resource allocation scheme. Recently, a fast greedy resource allocation algorithm was developed for both single-session and multi-session video multicast services. This algorithm uses a utility function that is the logarithm of the received throughput to achieve user fairness. A strong assumption is made in this algorithm that all the enhancement layers have the same size, which limits its applicability in practice. Another approach generalizes the model with the support of flexible layer rates and a general utility function. An optimal pseudo-polynomial algorithm based on dynamic programming has been proposed for both single-session and multi-session scenarios.

SUMMARY

Exemplary embodiments of the present invention provide efficient utilization of resources to multicast data streams via a plurality of layers by collectively allocating resource slots to layers assigned a common modulation and coding scheme. In particular, exemplary embodiments provide a means to determine a maximal utility that is achievable using the collective resource allocation and to assign modulation and coding schemes to layers to obtain the maximal utility.

One embodiment is directed to a method for transmitting layers of a data stream over wireless resources partitioned into slots. The method may include receiving feedback indicating channel state information from a set of receiver devices. Further, a maximal utility for the set of receiver devices can be determined based on the received feedback by determining the utilities of potential assignments of a set of modulation and coding schemes to a set of layers such that data from different layers correlated to a common modulation and coding scheme in an assignment is allocated resource slots jointly. In addition, MCS assignments may be selected based on the maximal utility and the set of layers may be transmitted to the set of receiver devices in accordance with the selected MCS assignments.

Another embodiment is drawn towards a method for transmitting layers of a data stream over wireless resources partitioned into slots. The method may include receiving feedback indicating channel state information from a set of receiver devices. Based on the received feedback, a maximal utility for the set of receiver devices can be determined by determining values of the minimum number of slots utilized for potential assignments of a set of modulation and coding schemes to a set of layers to achieve the maximal utility such that data from different layers correlated to a common modulation and coding scheme in an assignment is allocated a common resource slot. Further, MCS assignments can be selected based on the maximal utility and the set of layers may be transmitted to the set of receiver devices in accordance with the selected MCS assignments.

An alternative embodiment is directed to a system for transmitting layers of a data stream over wireless resources partitioned into slots. The system may include a receiver configured to receive feedback indicating channel state information from a set of receiver devices. In addition, the system may include a controller configured to determine a maximal utility for the set of receiver devices based on the received feedback by determining values of the minimum number of slots utilized for potential assignments of a set of modulation and coding schemes to a set of layers to achieve the maximal utility such that data from different layers correlated to a common modulation and coding scheme in an assignment is allocated a common resource slot. Moreover, the system may also include a scheduler and a transmitter. The scheduler can be configured to select MCS assignments based on the maximal utility and the transmitter can be configured to transmit the set of layers to the set of receiver devices in accordance with the selected MCS assignments.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Prior to discussing exemplary embodiments in detail, it is important to note that previously known resource allocation schemes allocate resources separately for each layer in a video session, even when several layers are modulated with the same MCS. However, allocating resources separately can result in a low utilization ratio of bandwidth resources in some scenarios. As an example, a multicast video session which has 10 layers with the same data rate of 32 kbps is considered, where each layer is transmitted with Quadrature Amplitude Modulation (QAM)16 3/4. If resources are allocated separately and one slot can provide a 28.8 kbps data rate with QAM16 3/4, then [32/28.8]=2 slots are needed to transmit one video layer and 20 total slots are needed for this video session. Thus, the utilization ratio is 32*10/28.8*20=55.6%.

To improve utilization of the bandwidth resources, exemplary embodiments of the present invention introduce the notion of Joint Layer Resource Allocation, which permits systems to jointly allocate bandwidth resources for several layers which are assigned with the same MCS. For the example provided above, where all layers are assigned with QAM16 3/4, the total bandwidth budget for the 10 layers in accordance with Joint Layer Resource Allocation is [10*32/28.8]=12 slots and the utilization ratio is 32*10/28.8*12=92.6%, which is an improvement of 37%.

In exemplary embodiments discussed herein below, a novel model including a combination of Adaptive Modulation and Coding (AMC) and Joint Layer Resource Allocation can be applied to scalable video multicast sessions in broadband wireless networks, in addition to other applications. To the knowledge of the inventors, no previous work considers joint layer allocation with AMC for scalable video multicast or indicates any way of implementing it. Therefore, not only are results and processes described herein below novel, but so is the problem itself. Moreover, the model permits a flexible layer rate and can use a general utility which can be both user-dependent and session-dependent for non-negative and non-decreasing received data rates. Additionally, an optimal pseudo-polynomial MCS assignment scheme based on dynamic programming for a single-session video multicast can be employed. Further, Fully Polynomial Time Approximation Schemes (FPTAS) for both single-session and multi-session scenario can be utilized to implement efficient resource allocation, as discussed further herein below.

Figure 1:
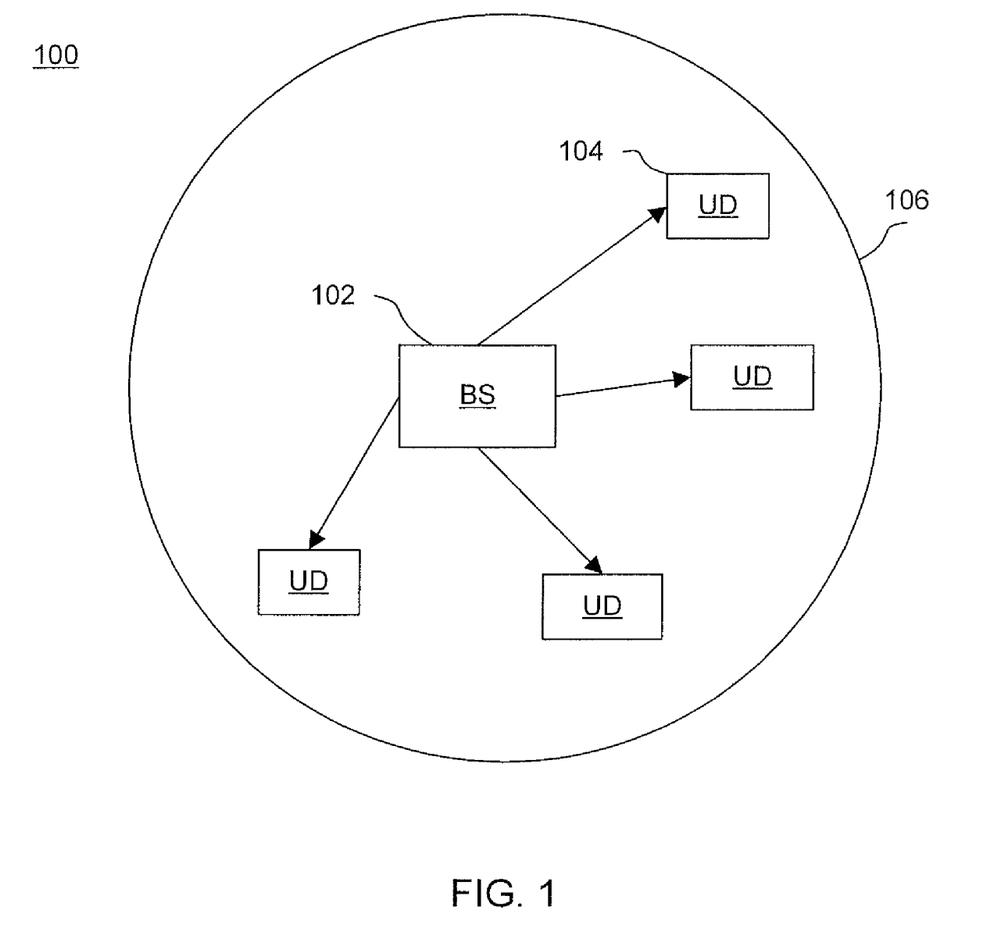
FIG. 1 is block diagram of a portion of an exemplary broadband wireless network.

Referring now in detail to the figures in which like numerals represent the same or similar elements and initially to FIG. 1, a cellular wireless network communication system 100 in which exemplary embodiments of the present invention can be implemented is illustrated. System 100 may include one or more base stations 102 of a wireless cellular network, such as a 4G network, having a range 106 and a plurality of user-receiver devices 104, such as cellular telephones, mobile wireless devices and other wireless computer devices. In accordance with exemplary implementations discussed herein below, the base stations 102 can be configured to assign appropriate MCSs to layers amongst multiple video sessions with the purpose of optimizing a generic utility function under the constraint of system resources.

Figure 2:
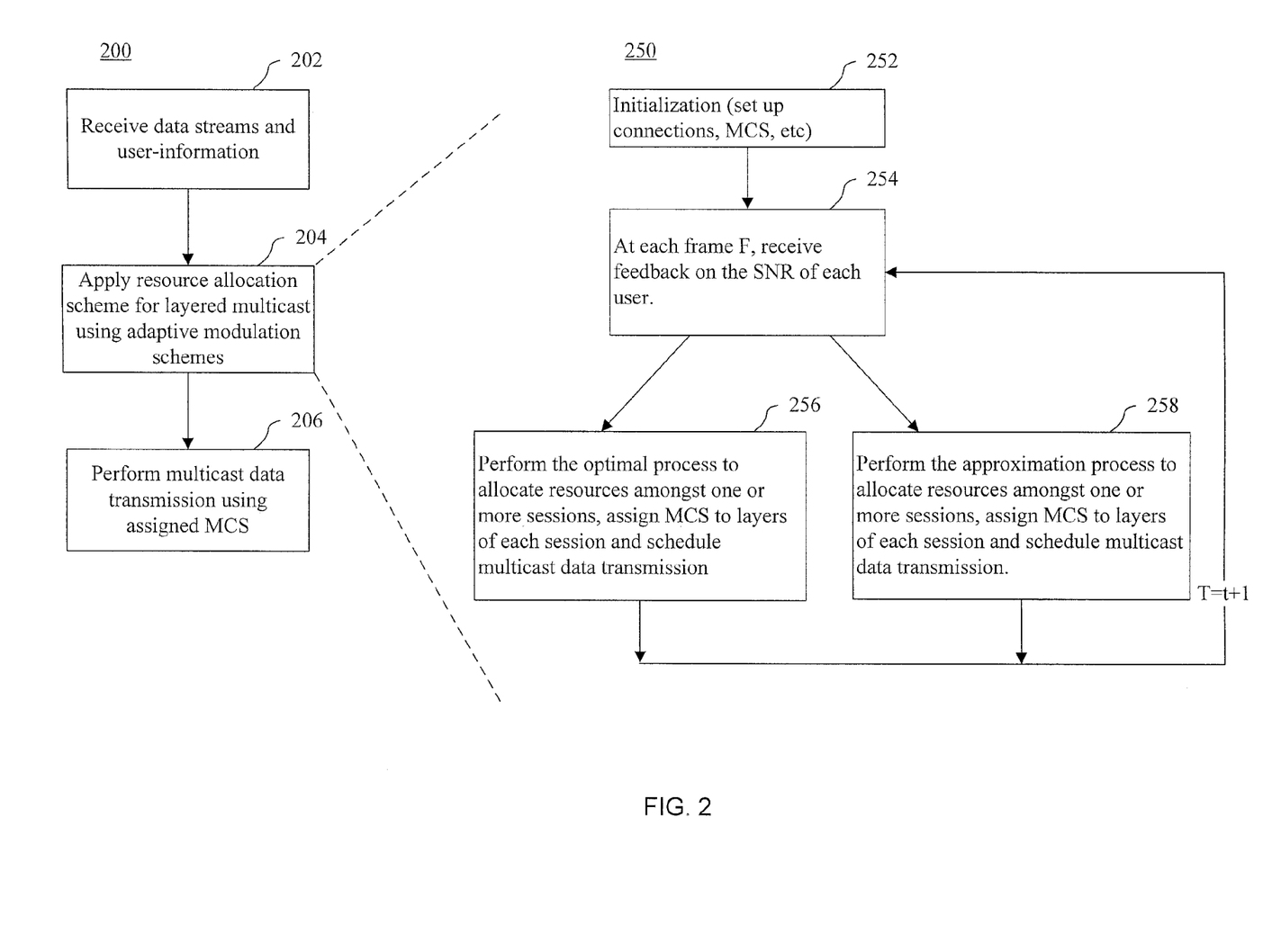
FIG. 2 is a block/flow diagram of a method for assigning modulation and coding schemes and allocating resources to layers of a data stream for transmission over a wireless network in accordance with an exemplary embodiment of the present invention.

With reference now to FIG. 2, a method 200 for transmitting layers of a data stream over wireless resources in accordance with exemplary embodiments of the present invention that can be performed by one or more base stations 102 is illustrated. Method 200 may begin at step 202, in which the base station 102 can receive data streams, such as SVC video streams, and user-information, such as information identifying receiver devices that can be serviced by the base station 102. At step 204, the base station 102 can apply a resource allocation scheme for layered multicast that uses adaptive modulation schemes. At step 206, the base station 102 can perform multicast data transmission using MCS assignments selected in accordance with the resource allocation scheme in step 204. Several different exemplary resource allocation schemes can be implemented by the base station in accordance with various embodiments of the present invention.

To better illustrate exemplary processes and systems that can be implemented in one or more base stations 102 to perform resource allocation, a model on which the processes and systems are based is described herein below. Here, it is assumed that there are T slots in a frame available for multicast data streaming, such as video streaming, where a slot can refer to a minimum allocation unit in the time domain, frequency domain, or in the joint space of time domain and frequency domain. The possible modulation and coding schemes (MCS) are denoted and indexed as m=1, . . . , M. For example, MCS m=1 represents QPSK-1/2, and so on. $R_m$ is the data rate provided by a single slot with MCS m. A higher MCS index indicates a higher corresponding data rate. N is the set of users serviced by a base station. Each user has a set of decodable MCS which can be periodically reported by the user when a frame starts. Generally a user can decode all the MCS lower than m if MCS m is decodable for him. $N_m$ denotes the set of users for whom MCS m is the highest decodable MCS. Some notations used herein are summarized in Table 1 below.

TABLE 1

| | Notations |
|---|---|
| T | Number of slots in a frame |
| M | Number of possible MCSs |
| S | Number of video sessions |
| J | Number of users |
| L | Number of layers in a video session |
| $R_m$ | Data rate of a single slot using MCS m |
| $\lambda_l$ | Required video rate of the $l^{th}$ layer |
| $\tau_{l_1,l_2,m}$ | Number of slots required for transmitting the layers from $l_1$ to $l_2$ using MCS m |
| N | Set of users in the system |
| $N_m$ | Set of users who can only decode MCS up to and including m |
| $U_j(r_j)$ | Utility of the user j with data rate $r_j$ |
| $\mu_{j,l}$ | Utility of the user j who receives l valid layers |
| $\mathcal{M}(l)$ | The MCS assigned for layer l in a solution |
| $\mathcal{L}(m)$ | The valid number of layers that the users in set $N_m$ can receive in a solution |
| $\mathcal{T}(\Phi)$ | The total slots consumption in solution $\Phi$ |

As indicated above, a scalable video sequence is composed of multiple video layers with flexible layer rates. L is denoted as the number of layers and $\lambda_l$ is denoted as the data rate of the layer l. A layer l is valid for a user only when this user has correctly received all the layers below l, i.e., from layer 1 to l−1. $\mathcal{L}$ (m) is denoted as the number of valid layers for the users in set $N_m$. As a result, $\mathcal{L}$ (m) should be the maximum number of continuous layers which are modulated with MCS 1 to m starting from the base layer. $\mathcal{M}$ (l) is denoted as the MCS assigned for layer l. It should be noted that if layer l is not transmitted, $\mathcal{M}$ (l) is set as $\mathcal{M}$ (l)=∞ and accordingly $R_\infty$ is set as $R_\infty=\infty$ and $N_\infty$ is set as $N_\infty=\phi$. As such, $\mathcal{L}$ (m)=max{l|0<$\mathcal{M}$ (l')≦m} for all l'∈{1, 2, . . . , l}, 1≦l≦L. It should be noted that the maximum over an empty set is zero. In addition, $\mathcal{L}$ (0) is set to zero for some special cases as discussed further herein below. Thus, the received rate for the users in set $N_m$, can be obtained, e.g., $$r_j = \sum_{l=1}^{L(m)} \lambda_l, \; j \in N_m.$$

The utility for user j is defined here to be a general function of the use rate $r_j$, denoted as $U_j(r_j)$. This utility function can be an arbitrary non-decreasing non-negative function and can be both user dependent and session dependent when applied in the multiple video session scenario. For example, it can be a weighted peak signal-to-noise ratio (PSNR): $U_j(r_j)=w_j$PSNR $(r_j)$ where $w_j$ is the weight of user j and PSNR($r_j$) is the PSNR of the video if only rate $r_j$ is received. If $w_j$ is set to $w_j=1$ for every user j, an objective here is to maximize the sum of PSNR of all multicast users in the video session.

$\mu_{j,l}$ denotes the utility of the user j that can receive l valid layers. Thus, $$\mu_{j,l} = U_j\left(\sum_{l'=1}^{l} \lambda_{l'}\right).$$

The system utility U is defined to be the sum of the utility of all the users:

$$U = \sum_{j \in N} U_j(r_j) = \sum_{m=1}^{M} \sum_{j \in N_m} U_j(r_j) = \sum_{m=1}^{M} \sum_{j \in N_m} \mu_{j,\mathcal{L}(m)} \quad (1)$$

An objective of exemplary embodiments of the present invention is to determine the optimal MCS assignment strategy that can maximize the total system utility U under the system constraint T. In other words, exemplary embodiments decide the values of all $\mathcal{M}$ (l) for 1≦l≦L, in order to $$\text{Maximize } U = \sum_{m=1}^{M} \sum_{j \in N_m} \mu_{j,\mathcal{L}(m)} \quad (2)$$

As mentioned above, in order to improve bandwidth utilization, the notion of Joint Layer Resource Allocation for this problem is introduced. Here, the system is permitted to combine several continuous video layers that are assigned with the same MCS and jointly allocate resources for them. $\tau_{l_1,l_2,m}$ is denoted as the number of slots needed to transmit the layers from $l_1$ to $l_2$ if they are all modulated with MCS m. Thus, $$\tau_{l_1,l_2,m} = \left\lceil \sum_{l=l_1}^{l_2} \frac{\lambda_l}{R_m} \right\rceil.$$

If $l_1 > l_2$, we set $\tau_{l_1,l_2,m}=0$.

Based on this notion, a key property for the optimal MCS assignment strategy is introduced in Lemma 1, below. The proof is omitted here for brevity purposes.

Lemma 1: There exists an optimal solution for (2), in which for all 1≦l≦L we have $\mathcal{M}$ (l+1)>$\mathcal{M}$ (l).

According to Lemma 1, for the optimal solutions claimed by Lemma 1, the MCS should be assigned in an ascending order from the base layer to the topmost enhancement layer. As such, the system constraint can be expressed as $$\sum_{m=1}^{M} \tau_{\mathcal{L}(m-1)+1,\mathcal{L}(m),m} \leq T \quad (3)$$

where $\mathcal{L}$ (0) is initialized as 0.

The objective of determining the optimal solution claimed by Lemma 1 under the system constraint (3) can be clearly established and the solutions referred to herein below are claimed by Lemma 1.

It should be noted that it is not assumed that the base layer is required to be received by all users as in previous approaches. Instead, exemplary embodiments can aim to maximize the total system utility of all video multicast sessions. Therefore, it is possible that some video sessions are completely dropped or some users cannot decode any layers (e.g. in an overloaded system) in order to maximize the overall video quality. As a result, when the system is overloaded, admission control can be automatically provided based on the utility maximization.

However, alternative embodiments can enforce the base layer requirement when the maximum number of slots are sufficient to modulate all base layers using an MCS that can be received by all users in each session. For example, each base layer can be initially transmitted using the highest MCS that is decodable by all users in each session, can allocate an appropriate number of slots for each base layer and can then run resource allocation processes described herein below on the remaining slots and on all enhancement video layers.

Returning to FIG. 2 with continuing reference to FIG. 1, a method 250 that can be implemented in the resource allocation step 204 in accordance with various exemplary embodiments of the present invention is illustrated. The method 250 may begin at step 252 in which the base station 102 can be initialized. For example, the base station 102 may set up connections and multicast video sessions and can determine potential MCSs to employ. At step 254, the base station can receive feedback, indicating channel state information from each receiver of a set of receiver devices 104. For example, at each frame F, the base station 102 can receive feedback on the signal-to-noise ratio (SNR). Additionally, the channel state information can include the average signal-to-interference-and-noise-ratio (SINR). Thereafter, the method 250 can perform one or more processes. For example, the method 250 may proceed to step 256, in which the base station 102 can perform an "optimal process" to allocate resources amongst one or more sessions, assign MCS to layers of each session and schedule multicast data transmission. Alternatively or additionally, the method 250 may proceed to step 258, in which the base station 102 can perform an "approximation process" to allocate resources amongst one or more sessions, assign MCS to layers of each session and schedule multicast data transmission. The optimal process, described further herein below, achieves optimal system utility in pseudo-polynomial time, while the approximation processes are more practical for the wireless systems, as they achieve low complexity with an acceptable degree of performance guarantee. Each of the processes can support Joint Layer Resource Allocation, variable-sized video layers and a very general utility function. Thereafter, step 254 and step 256 and/or step 258 can be repeated for each frame.

The optimal process can be implemented as a dynamic programming algorithm that can be used to solve the problem (2). As an example, a scenario of a video session with layers 1 to l with t slots used to transmit this session is considered. Here, each layer is modulated with one MCS chosen from 1~m. An auxiliary function u(l,m,t) is denoted to be the maximal utility the users in set $\cup_{m'=1}^{m} N_{m'}$ can achieve with this session. It should be noted that if there are not enough slots to modulate all the layers, u(l,m,t) will be set to $-\infty$. An objective here is to recursively compute the values of u(l,m,t) from the base layer to the highest enhancement layer. In the optimal solution claimed by Lemma 1, several topmost layers maybe left un-modulated. As such, the optimal solution should be the one with the maximum utility among u(l,M,T) for all $1 \leq l \leq L$, i.e., $U^* = \max\{u(l,M,T):1 \leq l \leq L\}$. By convention, the maximum over an empty set is 0 for non-negative utilities. The recurrence relation of u(l,m,t) is shown in Recursion 1 in Table 2 below.

TABLE 2

Recursion 1

Recursion 1 Recurrence relation of u(l, m, t)
Initial conditions:

| | |
|---|---|
| u(0, m, t) = 0 | for all m ≥ 0 and 0 ≤ t ≤ T |
| u(l, 0, t) = $-\infty$ | for all l ≥ 1 and 0 ≤ t ≤ T |
| u(l, m, t) = $-\infty$ | for all l, m ≥ 0 and t < 0 |

Recursion:

$$u(l, m, t) = \max_{\delta=0}^{l}\left(u(l-\delta, m-1, t-\tau_{l-\delta+1,l,m}) + \sum_{j \in N_m} \mu_{j,l}\right)$$

for all $1 \leq l \leq L$, $1 \leq m \leq M$, and $0 \leq t \leq T$

The correctness of the recurrence relation can be proven by induction. The ranges for the parameters in u(l,m,t) are $0 \leq l \leq L$, $0 \leq m \leq M$ and $t \leq T$. The utility of the invalid scenarios is set to $-\infty$ in order to ensure that they will not be present in the final optimal solution. There are several base scenarios for u(l,m,t), as defined in the initial conditions in Table 2. When l=0 and $0 \leq t \leq T$, t slots are available to transmit 0 layers. Thus, u(0,m,t)=0. When m=0, $l \geq 1$ and $0 \leq t \leq T$, a nonexistent MCS is assigned to the layers below 1. This is an invalid scenario, as the layers must be modulated with MCS 1 to m. Therefore, $u(l,0,t) = -\infty$. When t<0, another invalid scenario is reached in which negative slots are used to transmit the layers. Similarly, $u(l,m,t) = -\infty$ for t<0.

A general scenario u(l,m,t) is now considered in which $1 \leq l \leq L$, $1 \leq m \leq M$, and $0 \leq t \leq T$, assuming all the values of u(l-1,m',t') are obtained for all $1 \leq m' \leq M$, $t \leq T$ and u(l,m',t') for all $0 \leq m' \leq m$, $t \leq T$. It is assumed in the optimal solution specified by u(l,m,t) that there are only $\delta$ layers modulated with MCS m, $0 \leq \delta \leq l$. In accordance with Lemma 1, these $\delta$ layers distribute from layer l-$\delta$ to l. The resources needed for them is denoted as $\tau_{l-\delta+1,l,m}$. Further, the layers from 1 to l-$\delta$ are modulated with an MCS index that is lower than m. Therefore, when $t \geq \tau_{l-\delta+1,l,m}$, then $u(l,m,t) = u(l-\delta, m-1, t-\tau_{l-\delta+1,l,m}) + \sum_{j \in N_m}\mu_{j,l}$. Additionally, when $t < \tau_{l,m}$, there are not enough slots to modulate all the $\delta$ layers with MCS m. Accordingly, this case becomes invalid, i.e. $u(l,m,t) = -\infty$. Considering that u(l,m,t) has been defined as $u(l,m,t) = -\infty$ for all t<0 in the third initial condition in Table 2, the following can be obtained $$u(l,m,t) = u(l-\delta, m-1, t-\tau_{l-\delta+1,l,m}) + \sum_{j \in N_m}\mu_{j,l} = -\infty + \sum_{j \in N_m}\mu_{j,l},$$
$$t = -\infty.$$

Therefore, $u(l-\delta, m-1, t-\tau_{l-\delta+1,l,m}) + \sum_{j \in N_m}\mu_{j,l}$ is a uniform equation for computing u(l,m,t).

As the number $\delta$ of layers modulated with MCS m can be from 0 to l, u(l,m,t) is the maximum value among all possible choices of $\delta$ such that $0 \leq \delta \leq l$. Thus, $$u(l, m, t) = \max_{\delta=0}^{l}\left(u(l-\delta, m-1, t-\tau_{l-\delta+1,l,m}) + \sum_{j \in N_m}\mu_{j,l}\right)$$

With regard to the complexity of this joint layer MCS assignment algorithm, the values of $\mu_{j,l}$ can be pre-computed together before the recursion procedure in O(LJ), where J is the number of users in set N. In addition, the values of $\tau_{l_1,l_2,m}$ can be pre-computed in O(L²M). For the recursion procedure, the values of u(l,m,t) for all $1 \leq l \leq L$, $1 \leq m \leq M$, and $0 \leq t \leq T$, are computed and every step of the recursion has a complexity of O(L), as shown in Recursion 1 in Table 2. Thus, the complexity of the recursion is O(L²M(T+1)). Based on the results of the recursion, the maximum system utility is obtained in O(L). Therefore, the complexity for this single-session algorithm is O(LJ+L²M+L²M(T+1)+L)=O(LJ+L² MT).

The recursion algorithm in Table 2 discussed above was applied for the single session case. In the multi-session scenario, for example, if there is more than one session in one scheduling frame, then resources should be optimally allocated among sessions. For example, it can be assumed that there are S sessions in the system. Based on the algorithm in Table 2, the maximum system utility for each session with a resource constraint of t, i.e., $\tilde{u}^{[s]}(t) = \max\{u^{[s]}(l,M,t):1 \leq l \leq L^{[s]}\}$, can be computed. Using the values of $\tilde{u}^{[s]}(t)$ for all $1 \leq s \leq S$, $0 \leq t \leq T$ as the input for the inter-session resource allocation algorithm described in co-pending, commonly assigned U.S. patent application Ser. No. 12/696,703, filed on Jan. 29, 2010, which is incorporated herein by reference, the maximum system utility for multiple sessions can be obtained. One implementation of the inter-session resource allocation algorithm is discussed further herein below with respect to FIG. 3.

Figure 3:
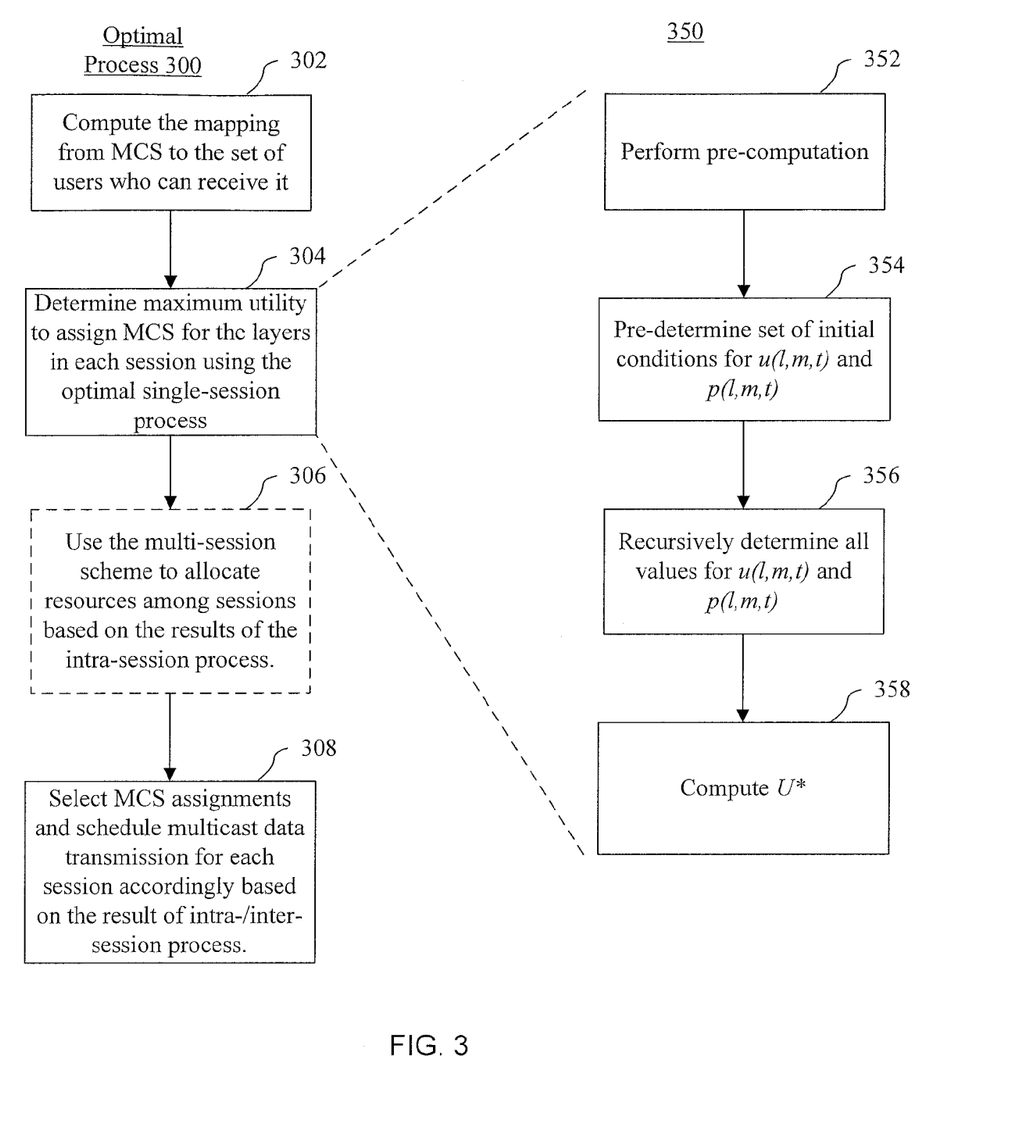
FIG. 3 is an exemplary block/flow diagram of a method for assigning modulation and coding schemes and allocating resources to layers of a data stream for transmission over a wireless network using an optimal approach in accordance with an exemplary embodiment of the present invention.

Referring now to FIG. 3 with continuing reference to FIGS. 1 and 2, one exemplary method 300 for implementing an optimal process to allocate resources and assign MCS to layers is presented. It should be understood that method 300 can be implemented to perform step 256 in method 200. Method 300 can begin at step 302, in which the base station 102 can compute the mapping from MCSs to the set of users 104 who are capable of employing the MCSs. In other words, at step 302, the base station 102 can determine the MCS capabilities of each user device 104. For example, the base station 102 can determine the MCS capabilities based on identifiers of the receiver devices 104 obtained during connection setups in step 252.

At step 304, the base station 102 can determine a maximal utility for the set of receiver devices based on the received feedback to assign MCS to the layers in each session using the optimal single session process. For example, the base station 102 can employ Recursion 1 in Table 2 to find the maximum utility for the set of receiver devices and to assign MCS to the layers in each session. In particular, a method 350 that utilizes Recursion 1 of Table 2 can be performed to implement step 304.

Method 350 can begin at step 352 in which the base station 102 may pre-compute slots used to transmit blocks of layers and may pre-compute utilities based on the user-feedback. For example, the base station 102 can pre-compute the value of the slots needed $$\tau_{l_1,l_2,m} = \left\lceil \sum_{l=l_1}^{l_2} \frac{\lambda_l}{R_m} \right\rceil$$

when transmitting the layers from $l_1$ to $l_2$ with MCS m for all l and m indices. Thus, the base station 102 may pre-compute a number of slots for layer transmission for each potential assignment of blocks of layer indices ($l_1$ to $l_2$) a common MCS m. In addition, the base station may pre-compute the utility $$\mu_{j,l} = U_j\left(\sum_{k=1}^{l} \lambda_k\right)$$

for user j (for all possible l indices) if the video layers 1, 2, . . . , l are decodable for this user.

At step 354, the base station 102 can pre-determine a set of initial conditions for the utilities of potential assignments. For example, as indicated above in Table 2, the base station 102 can compute $u(0,m,t)=0$ for all $m \geq 0$ and $0 \leq t \leq T$ $u(l,0,t)=-\infty$ for all $l \geq 1$ and $0 \leq t \leq T$ $u(l,m,t)=-\infty$ for all $l,m \geq 0$ and $t<0$ The initial condition for p(l,m,t), discussed further herein below, can be determined as $p(0,m,t)=0$ for all $m \geq 0$, $0 \leq t \leq T$.

At step 356, the base station 102 can recursively determine the utilities of potential assignments. For example, as discussed above with regard to Recursion 1 of Table 2, the base station 102 can recursively compute the maximal utility of the users in set $\cup_{m'=1}^{m} N_{m'}$, when transmitting layers 1 to l using MCS chosen from 1 to m with the resource constraint t:

$$u(l,m,t) = \sum_{j \in N_m} \mu_{j,l} + \max_{\delta=0}^{l}(u(l-\delta, m-1, t-\tau_{l-\delta+1,l,m})),$$

for all $1 \leq l \leq L$, $1 \leq m \leq M$, and $0 \leq t \leq T$. In particular, as indicated by the factor $\tau_{l-\delta+1,l,m}$, data from different layers (ie. layers within the set $l-\delta+1$ to l) correlated to a common MCS, m, in an assignment can be allocated a common resource slot. For example, as discussed above with regard to the example contrasting Joint Layer Resource Allocation with separate allocation of resources, if resources are allocated separately and one slot can provide a 28.8 kbps data rate with QAM16 3/4, then [32/28.8]=2 slots are needed to transmit one video layer and 20 total slots are needed for this video session. Thus, in separate allocation of prior methods, 2 slots are allocated to a layer with unutilized resources remaining within a slot. However, in accordance with Joint Layer Resource Allocation, where all layers are assigned with QAM16 3/4, the total bandwidth budget for the 10 layers is [10*32/28.8]=12 slots. Thus, because layers having a common MCS are allocated resources jointly, one slot may include data from more than one layer. Indeed, data from all layers ($l-\delta+1$ to l) correlated to a common MCS, m, in an assignment can be allocated contiguous slot resources. As discussed above, joint layer allocation can significantly improve the utilization ratio of bandwidth resources.

In addition, it should be noted that a recursive determination step for a particular MCS determines a maximal utility for a particular layer index such that the recursive determination step for the particular MCS is constrained to assign to the particular MCS a block of layer indices commencing from the particular layer index. For example, for MCS m, the recursion step assigns m a block of layers $l-\delta+1$ to l, with $0 \leq \delta \leq l$, commencing from l. Moreover, the recursion step for MCS m recursively determines corresponding utilities for the particular layer index l by successively expanding the block until the lowest index for the set of layers is processed. For example, by successively varying δ from 0 to l, the block of layers commencing from l is expanded until the lowest layer index, 1, is reached.

Further, it should also be noted that the recursion computation performed for $$u(l,m,t) = \sum_{j \in N_m} \mu_{j,l} + \max_{\delta=0}^{l}(u(l-\delta, m-1, t-\tau_{l-\delta+1,l,m})),$$

for all $1 \leq l \leq L$, $1 \leq m \leq M$, and $0 \leq t \leq T$, can begin from the initial conditions for each particular MCS m such that each successive iteration of u(l,m,t) can obtain the value of $\max_{\delta=0}^{l}$ $(u(l-\delta,m-1,t-\tau_{l-\delta+1,l,m}))$ from a previous iteration. For example, for l=1, for any value of m, the value of u(l-δ,m-1,t-$\tau_{l-\delta+1,l,m}$) is zero from the initial conditions and u(l,m,t) is based only on $$\sum_{j \in N_m} \mu_{j,l}$$

which is obtained from the user-feedback in step 254 of method 250. Thus, as $$u(l, m, t) = \sum_{j \in N_m} \mu_{j,l} + \max_{\delta=0}^{l} (u(l-\delta, m-1, t-\tau_{l-\delta+1,l,m}))$$

is determined for all $1 \leq l \leq L$, $1 \leq m \leq M$, and $0 \leq t \leq T$, the factor $u(l-\delta, m-1, t-\tau_{l-\delta+1,l,m})$ can be determined for each m, l or t from a previous iteration, which is based on user utilities $\mu_{j,l}$. Accordingly, for a recursion step for a particular MCS m for a particular layer index l, utility values obtained while varying $\delta$ can be determined in a previous recursion step for an MCS (m−1) preceding the particular MCS.

To permit the assignments of MCS to layers, as discussed further herein below, while recursively determining the utility values u(l,m,t) at step 356, the base station 102 can record the number of layers modulated with MCS m to achieve the utility u(l,m,t) with resources t. This number of layers is denoted here as p(l,m,t) and the base station can compute p(l,m,t) for each corresponding computation of u(l,m,t) as follows:

$$\arg\max_{\delta=0}^{l}(u(l-\delta,m-1,t-\tau_{l-\delta+1,l,m})), \text{ for all } 1 \leq l \leq L,$$
$$1 \leq m \leq M, \text{ and } 0 \leq t \leq T.$$

At step 358, the base station 102 can compute the maximal utility of this session with the resource constraint of T slots: $U^* = \max\{u(l,m,T):1 \leq l \leq L\}$. Here, if the utility of only a single session is sought to be optimized, the assignments of MCS to layers having the highest utility $U^*$ can be employed to transmit the data streams to the receivers 104. However, as noted above, optionally, the slot resources can be allocated between sessions to maximize overall utility using the methods disclosed in U.S. patent application Ser. No. 12/696,703, filed on Jan. 29, 2010.

Thus, optionally, at step 306, the multi-session scheme disclosed in the co-pending application can be employed to allocate resources among sessions based on the results of the intra-session process performed at step 304. For example, the values of $\tilde{u}^{[s]}(t)$ for all $1 \leq s \leq S$, $0 \leq t \leq T$ can be used as the input for the inter-session resource allocation algorithm, as discussed above. In one implementation of the inter-session algorithm, a dynamic programming approach can be employed to determine the maximum system utility. To illustrate the approach, $\tilde{u}^{[s]}(t)$ is used to represent the output results of session s obtained at step 304 while T(s) denotes the resources allocated to video session s. Here, an auxiliary function v(s,t) can be defined, where v(s,t) denotes the maximum utility of the video sessions from 1 to s with the total available resources t left for the sessions from 1 to s. In addition, to permit tracking of resource slots allocated to each session to achieve maximum system utility, a function q(s,t) is defined, where q(s,t) is the optimal number of resource slots allocated to a session, under a resource constraint of t for session s and sessions with lower indices. First, initial conditions, $v(1,t) = \tilde{u}^{[1]}(t)$ and $g(1,t) = t$ for all $0 \leq t \leq T$, can be computed. Second, using the initial conditions, the values of v(s,t) and q(s,t) can be computed recursively from the first session to all the S sessions. The recursion for v(s,t) is as follows:

$$v(s,t) = \max_{t'=0}^{t}(\tilde{u}^{[s]}(t') + v(s-1,t-t')) \text{ for all } 1 \leq s \leq S,$$
$$0 \leq t \leq T$$

Simultaneously, the values of q(s,t) can be determined recursively as follows:

$$q(s,t) = \arg\max_{t'=0}^{t}(\tilde{u}^{[s]}(t') + v(s-1,t-t')) \text{ for all } 1 \leq s \leq S,$$
$$0 \leq t \leq T$$

Third, the optimal system utility for multiple sessions can be computed as $U^* = v(S,T)$ for the total number of sessions S and the total number of available resource slots T.

At step 308, the base station 102 can select the MCS assignments to layers based on the results of the intra-/inter-session processes in step 304 or steps 304 and 306. In addition, the base station 102 can schedule multicast data transmission based on the results of the intra-/inter-session process in step 304 or steps 304 and 306.

For example, at step 308, for a single session scenario, the base station 102 can employ the maximum system utility $U^* = \max\{u(l,M,T):1 \leq l \leq L\}$ to recursively determine the highest layer index allocated to each MCS m corresponding to a maximum system utility and thereby determine the MCS assignments. For example, let L(M) denote the highest layer index allocated to MCS M. First, the initial condition for the recursion can be obtained using the results from step 356: $L(M) = \arg\max_{l=1}^{L} u(l,M,T)$. Second, the base station 102 can perform the recursion as follows:

$$L(m-1) = L(m) - p(L(m), m, T - \sum_{c=m+1}^{M} \tau_{L(c-1)+1,L(c),c}),$$
$$\text{for } m = M, M-1, \ldots, 2$$

As indicated above, the term p(L(m),m,t) denotes the number of consecutive layer indices ($\delta$) from layer index L(m) that is allocated to MCS m under the resource constraint t. The term $T - \sum_{c=m+1}^{M} \tau_{L(c-1)+1,L(c),c}$ denotes this resource constraint, as it provides the number slots remaining for MCS m and lower indices after the allocation of slots to MCS indices m+1 to M. Third, the MCS assignments can be made by assigning an MCS m to layer indices layers between the MCS m's highest layer index L(m) and the highest layer index below L(m) that is allocated to another MCS: $M(l) = \infty$, for all $l > L(M)$; and $M(l) = m$, for all $L(m-1) < l < L(m)$.

Alternatively, if a multi-session scenario is considered, the base station 102 can determine the MCS assignments using the maximum system utility $U^* = v(S,T)$ determined at step 306. For example, the base station 102 may first compute the optimal resource allocation among the users. Let q*(s) denote the optimal number of slots allocated to session s. q*(s) can be computed recursively as follows $$q^*(S) = q(S,T)$$

$$q^*(s) = q\left(s, T - \sum_{s'=s+1}^{S} q^*(s')\right) \text{ for } s = S-1, \ldots, 2, 1.$$

Thus, starting from q(S,T), which is known to the base station 102 from the recursion performed in step 306, the base station 102 can recursively compute the optimal number of slots allocated to each session s until the lowest session index is reached. In particular, the term $$T - \sum_{s'=s+1}^{S} q^*(s')$$

denotes the number of resource slots remaining for session s and lower session indices after the allocation of slots to session indices s+1 to S, and, with a known number of available slots, q*(s) can be computed using the values of q(s,t) determined at step 306.

To determine the MCS assignments for each session s in the multi-session scenario using the optimal approach, the single-session algorithm employed at step 304 can be applied.

Here, the total number of available slots T in $L(m-1)=L(m)-p(L(m),m,T-\Sigma_{c=m+1}^{M}\tau_{L(c-1)+1,L(c),c})$ in the single-session algorithm is replaced with $q^*(s)$. It should be noted that steps 352-356 need not be repeated, as all values of all values of $p(l,m,t)$ were recorded at step 356 when performed initially.

Returning to FIG. 2, upon completion of the application of a resource allocation scheme using an adaptive modulation scheme at step 204, the base station 102, at step 206, can transmit multicast data in accordance with the MCS/layer assignments and the schedule determined at step 204.

As indicated above, although the optimal process achieves optimal system utility in pseudo-polynomial time, the approximation processes discussed herein below are less complex and have an acceptable degree of performance. Thus, the approximation processes may be a more suitable choice, depending on the processing capability of the base station. In the approximation processes discussed herein below, the single session scenario will be described followed by a description of approximation processes in the multi-session scenario.

In the approximation approach, $v_{l,m}$ is denoted as the utility of all the users in set $N_m$ when they can receive layers 1 to l, i.e., $v_{l,m}=\Sigma_{j\in N_m}\mu_{j,l}$. Then, the system utility can be expressed as $$U = \sum_{m=1}^{M} v_{L(m),m}.$$

Lemma 2: Define $$\tilde{L}(m) = \max\{l \mid \tau_{1,l,m} \leq T\},$$

$$\tilde{v} = \max_{m=1}^{M} v_{\tilde{L}(m),m}, \tilde{m} = \text{argmax}_{m=1}^{M} v_{\tilde{L}(m),m},$$

then $\tilde{v}$ is a lowerbound and $M\tilde{v}$ is a trivial upperbound for the optimal system utility that can be achieved by any solution.

The proof of Lemma 2 is omitted for brevity purposes.

Here, it is assumed that the values of $v_{l,m}$ for all $1 \leq l \leq L$ and $1 \leq m \leq M$ are integers. As a result, all the possible values of system utility are also integers. According to Lemma 2, the utility ranges within the set $\{0, 1, \ldots, M\tilde{v}\}$. A scenario of a sub-session with l layers is considered, where each layer needs to be modulated with MCS 1 to m. For each $u \in \{0, 1, \ldots, M\tilde{v}\}$, the approximation approach attempts to find a solution whose total system utility for the users in set $\cup_{m'=1}^{m} N_{m'}$ is exactly u and whose total number of consumed slots are minimized. Let $t(l,m,u)$ denote this minimum Number of Slots (NoS) for this scenario and $t(l,m,u)$ is set $t(l,m,u)=+\infty$ if no such solution exists. The recurrence relation of $t(l,m,u)$ is shown in Recursion 2 in Table 3.

TABLE 3

Recursion 2

Recursion 2 Recurrence relation of t(l, m, u)
Initial conditions:

| | |
|---|---|
| t(0, m, 0) = 0 | for all m ≥ 0 |
| t(0, m, u) = +∞ | for all m ≥ 0 and 0 < u ≤ Mṽ |
| t(l, 0, u) = +∞ | for all l ≥ 1 and 0 ≤ u ≤ Mṽ |
| t(l, m, u) = +∞ | for all l, m ≥ 0 and u < 0 |

Recursion:

$$t(l, m, u) = \max_{\delta=0}^{l}(t(l-\delta, m-1, u-v_{l,m}) + \tau_{l-\delta+1,l,m}),$$

for all $1 \leq l \leq L$, $1 \leq m \leq M$, and $0 \leq u \leq M\tilde{v}$.

The correctness of the recurrence relation in Table 3 can be proven by induction. The ranges for the parameters in $t(l,m,u)$ are $1 \leq l \leq L$, $1 \leq m \leq M$ and $u \leq M\tilde{v}$. It should be noted that the NoS of the invalid scenarios is set to $+\infty$ in order to ensure that they will not be present in the final optimal solution. There are several base scenarios for $t(l,m,u)$, as defined in the initial conditions in Table 3. l=0 corresponds to the 0 layer, which can generate no utility. Thus, the only valid value of the utility is 0 and its minimum NoS is 0. Then $t(0,m,0)=0$ and $t(0,m,u)=+\infty$ for u>0. When m=0, l≧1 and u>0, a nonexistent MCS is assigned to the layers below l. This is an invalid scenario as the layers need to be modulated with MCS 1 to m. Therefore, $t(l,0,u)=+\infty$ for l≧1 and u>0. When u<0, another invalid scenario is obtained in which a negative utility is generated. Similarly $u(l,m,t)=-\infty$ for t<0.

A general scenario $t(l,m,u)$ is now considered in which $1 \leq l \leq L$, $1 \leq m \leq M$ and $0 \leq u \leq M\tilde{v}$, assuming that all the values of $t(l-1,m',u')$ for all $0 \leq m' \leq M$, $u \leq M\tilde{v}$ and $u(l,m',u')$ for all $0 \leq m' < m$, $u \leq M\tilde{v}$ have been obtained. It is assumed in the optimal solution specified by $t(l,m,u)$ that there are only $\delta$ layers modulated with MCS m, $0 \leq \delta \leq l$. According to Lemma 1, these $\delta$ layers distribute from layer l−$\delta$ to l. The NoS needed for them is $\tau_{l-\delta+1,l,m}$. In addition, the utility of the users in set $N_m$ is $v_{l,m}$. The layers from 1 to l−$\delta$ are modulated with MCS lower than m. Therefore, $t(l,m,u)=t(l-\delta,m-1,u-v_{l,m})+\tau_{l-\delta+1,l,m}$.

As the number $\delta$ of layers modulated with MCS m can be from 0 to l, $t(l,m,u)$ is the minimum value among all possible choices of $\delta$ such that $0 \leq \delta \leq l$. Thus, $$t(l, m, u) = \min_{\delta=0}^{l}(t(l-\delta, m-1, u-v_{l,m}) + \tau_{l-\delta+1,l,m}).$$

Based on the results of the recursion, the maximum system utility with the total NoS bounded by T can be obtained:

$$U^* = \max\{u \mid t(l,M,u) \leq T, 1 \leq l \leq L\} \quad (4)$$

Regarding the complexity of this dynamic programming algorithm, the values of $\tau_{l_1,l_2,m}$, $v_{l,m}$ and $\tilde{v}$ can be precomputed in $O(L^2M+LJ+LM+LM)=O(LJ+L^2M)$. The complexity of the recursion procedure is $O(L^2M*M\tilde{v})=O(L^2M^2\tilde{v})$. Further, the complexity of computing $U^*$ is $O(L*M\tilde{v})$. Therefore, the complexity for this dynamic programming algorithm is $O(LJ+L^2M+L^2M^2\tilde{v}+L*M\tilde{v})=O(LJ+L^2M^2\tilde{v})$.

Based on the dynamic programming algorithm described above with respect to Table 3, a fully polynomial time approximation scheme (FPRAS) for the problem (2) is introduced and provided as Algorithm 1 in Table 4 below.

TABLE 4

Algorithm 1 FPTAS for single-session problem (2)

1. Given $\epsilon > 0$, let $K = \epsilon\tilde{v}/M$.
2. For each $v_{l,m}$, define $v'_{l,m} = \lfloor v_{l,m}/K \rfloor$.
3. Use Recursion 2 to compute the values of t(l, M, u) for $1 \leq l \leq L$ and $0 \leq u \leq M \lfloor \tilde{v}/K \rfloor$ by replacing all the $v_{l,m}$ with $v'_{l,m}$.
4. Use Eq. (4) to compute the maximum utility $U^*$ under the resource constraint T. Let $\Theta'$ denote the optimal solution which can achieve this maximum utility.
5. Output $\Theta'$.

Theorem 1: Algorithm 1 is a fully polynomial time approximation scheme for problem (2) within an approximation factor of 1−$\epsilon$ and with complexity $O(LJ+L^2M^3/\epsilon)$.

The proof for Theorem 1 is omitted for brevity purposes.

Turning now to the multiple sessions scenario in the approximation approach, it is assumed that there are a total of S sessions in the system. To differentiate the variables in different sessions, a superscript '[s]' is added after the variables to specify their sessions. Then the system utility in the multi-session scenario can be expressed as $$U = \sum_{s=1}^{S} \sum_{m=1}^{M} v_{\mathcal{L}^{[s]}(m),m}^{[s]}.$$

Lemma 3: Define $$\hat{v} = \max_{s=1}^{S} \tilde{v}^{[s]},$$

$$\hat{s} = \underset{s=1}{\operatorname{argmax}}^{S} \tilde{v}^{[s]}.$$

Then $\hat{v}$ is a lowerbound and $SM\hat{v}$ is a trivial upperbound for the optimal system utility that can be achieved by any solution.

The proof of Lemma 3 is also omitted for brevity purposes.

It is assumed the values of $v_{l,m}^{[s]}$ for all $1 \leq s \leq S$, $1 \leq l \leq L^{[s]}$ and $1 \leq m \leq M$ are integers. Thus, all the possible values of system utility are also integers and, according to Lemma 3, the utility ranges within the set $\{0, 1, \ldots, SM\tilde{v}\}$.

Let $\tilde{t}^{[s]}(u)$ denote the minimum required NoS when the system utility of session s is exactly u. Based on the results of the single session Algorithm 1 in Table 4, $\tilde{t}^{[s]}(u) = \min_{l=1}^{L^{[s]}} t(l, M, u)$, $0 \leq u \leq M\tilde{v}^{[s]}$.

A scenario with sessions from 1 to s is considered where for each $u \in \{0, 1, \ldots, SM\hat{v}\}$, a solution whose total system utility of these sessions is exactly u and whose total number of consumed slots are minimized is sought. Let h(s,u) denote this minimum NoS for this scenario. The recurrence relation of h(s,u) is shown in Recursion 3 in Table 5.

TABLE 5

Recursion 3

Recursion 3 Recurrence relation of h(s, u)
Initial conditions:

$$h(1, u) = \begin{cases} \tilde{t}^{[1]}(u), & \text{if } 0 \leq u \leq M\tilde{v}^{[1]} \\ +\infty, & \text{otherwise} \end{cases}$$

Recursion:

$$h(s, u) = \min_{u'=0}^{\min\{u, M\tilde{v}^{[s]}\}} \left( h(s-1, u-u') + \tilde{t}^{[s]}(u') \right)$$

for all $2 \leq s \leq S$, $0 \leq u \leq SM\tilde{v}$.

The correctness of the recurrence relation in Table 5 can be proved by induction. In the base scenario, there is only session 1. Clearly, when $0 \leq u \leq M\tilde{v}^{[1]}$, $h(1,u) = \tilde{t}^{[1]}(u)$. According to Lemma 2, $M\tilde{v}^{[1]}$ is a trivial upperbound of the maximum utility for session 1 under the resource constraint of T. Therefore, when $u > M\tilde{v}^{[1]}$, $h(1,u) > T$. As it is a meaningless result for the final solution, $h(1,u)$ is set to $h(1,u) = +\infty$ for $u > M\tilde{v}^{[1]}$.

A generic scenario of h(s,u) is now considered in which $2 \leq s \leq S$ and $0 \leq u \leq SM\hat{v}$, assuming that all the values of h(s', u) for all $1 \leq s' < s$ and $0 \leq u \leq SM\hat{v}$ have been attained. It is assumed in the optimal solution specified by h(s,u), session s generates utility u', $0 \leq u' \leq u$. The minimum NoS needed by session s to generate utility u' is independent from the sessions from 1 to s−1. Thus, $h(s,u) = h(s-1, u-u') + \tilde{t}^{[s]}(u')$. As indicated above, u' can only range from 0 to $M\tilde{v}^{[s]}$ while u varies from 0 to $SM\hat{v}$. Accordingly, the actual range of u' should be from 0 to $\max\{u, M\tilde{v}^{[s]}\}$. h(s,u) is the minimum value among all possible values of u' such that $0 \leq u' \leq \max\{u, M\tilde{v}^{[s]}\}$. Thus, $$h(s, u) = \min_{u'=0}^{\min\{u, M\tilde{v}^{[s]}\}} \left( h(s-1, u-u') + \tilde{t}^{[s]}(u') \right)$$

Based on the results of the recursion, the maximum system utility with the total NoS bounded by T can be obtained $$U^* = \max[(\{u|h(S,u) \leq T\})] \quad (5)$$

Turning now to the complexity of this multi-session dynamic programming algorithm, the values of $\tilde{t}^{[s]}(u)$ and $\hat{v}$ can be obtained based on the dynamic programming algorithm in Table 3, discussed above. $\hat{L}$ can be defined as $\hat{L} = \max_{s=1}^{S} L^{[s]}$, and J is defined as $J = \Sigma_{s=1}^{S} J^{[s]}$, then the complexity is $O(\Sigma_{s=1}^{S} (L^{[s]}J^{[s]} + L^{[s]^2}M^2v^{[s]} + L^{[s]}\tilde{v}^{[s]})) = O(\hat{L}J + S\hat{L}^2M^2\tilde{v})$. Further, the complexity of the recursion procedure is $O(\Sigma_{s=1}^{S} SM\hat{v} * M\tilde{v}^{[s]}) = O(S^2M^2\hat{v}^2)$. In addition, the complexity of computing $U^*$ is $O(SM\hat{v})$. Therefore, the complexity for this dynamic programming algorithm is $O(\hat{L}J + S\hat{L}^2M^2\hat{v} + S^2M^2\hat{v}^2 + SM\hat{v}) = O(\hat{L}J + S\hat{L}^2M^2\hat{v} + S^2M^2\hat{v}^2)$.

Based on the dynamic programming algorithm discussed above with regard to Table 4, a fully polynomial time approximation scheme for the problem (2) is provided herein below as Algorithm 2 in Table 6.

TABLE 6

| | Algorithm 2 FPTAS for multi-session problem (2) |
|---|---|
| 1. | Given $\epsilon > 0$, let $K = \epsilon\hat{v}/M$. |
| 2. | For each $v_{l,m}^{[s]}$, define $v_{l,m}^{[s]'} = \lfloor v_{l,m}^{[s]}/K \rfloor$. |
| 3. | For each $s \in \{1, 2, \ldots, S\}$, use Recursion 2 in Table 3 to compute all the values of $t(l, M, u)$ for $1 \leq l \leq L^{[s]}$ and $0 \leq u \leq M\lfloor\tilde{v}^{[s]}/K\rfloor$ by replacing all the $v_{l,m}^{[s]}$ with $v_{l,m}^{[s]'}$. |
| 4. | Use Recursion 3 in Table 5 to compute all the values of h(S, u) for $0 \leq u \leq SM\lfloor\hat{v}/K\rfloor$ |
| 5. | Use Eq. (5) to compute the maximum utility $U^*$ under the resource constraint T. Let $\Theta'$ denote the optimal solution which can achieve this maximum utility. |
| 6. | Output $\Theta'$. |

Theorem 2: Algorithm 2 is a fully polynomial time approximation scheme for multi-session problem (2) within an approximation factor of 1−ϵS and with complexity $O(\hat{L}J + S\hat{L}^2M^3/\epsilon + S^2M^4/\epsilon^2)$. The proof has been omitted for brevity purposes.

Figure 4:
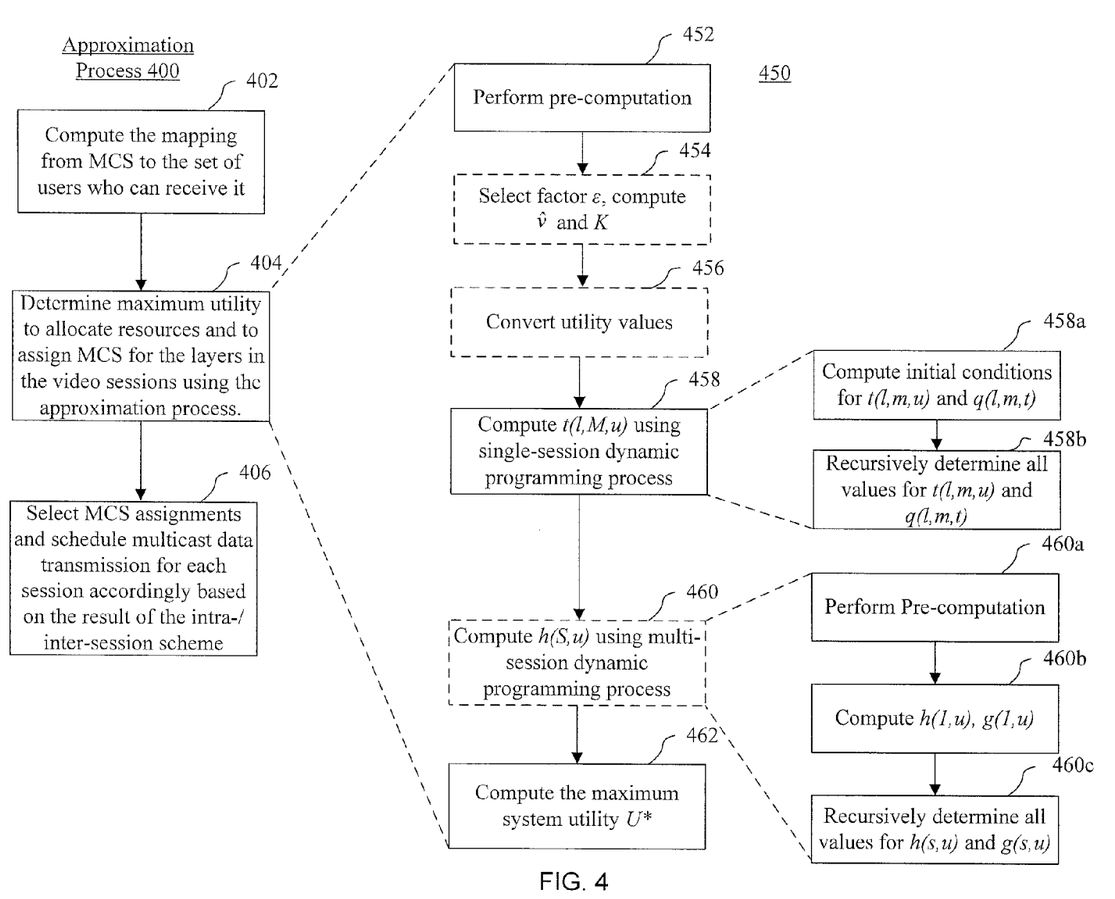
FIG. 4 is an exemplary block/flow diagram of a method for assigning modulation and coding schemes and allocating resources to layers of a data stream for transmission over a wireless network using an approximation approach in accordance with an exemplary embodiment of the present invention.

Referring now to FIG. 4 with continuing reference to FIGS. 1-3, one exemplary method 400 for implementing an approximation process to allocate resources and assign MCS to layers is presented. It should be understood that method 400 can be implemented to perform step 258 in method 200. Method 400 can begin at step 402, in which the base station 102 can compute the mapping from MCSs to the set of users 104 who are capable of employing the MCSs. In other words, at step 402, the base station 102 can determine the MCS capabilities of each user device 104. For example, the base station 102 can determine the MCS capabilities based on identifiers of the receiver devices 104 obtained during connection setups in step 252.

At step 404, the base station 102 can determine a maximal utility for the set of receiver devices based on the received feedback to assign MCS to the layers in each session using the approximation process. For example, the base station 102 can employ any one or more of Recursion 2 of Table 3, Algorithm 1 of Table 4, Recursion 3 of Table 5 and/or Algorithm 2 of Table 6 to find the maximum utility for the set of receiver devices and to assign MCS to the layers in each session. In particular, a method 450 can be performed to implement step 404.

Method 450 can begin at step 452 in which the base station 102 may pre-compute slots used to transmit blocks of layers and may pre-compute utilities based on the user-feedback received at step 254. For example, as indicated above, the base station 102 may compute the values of the slots needed $$\tau_{l_1,l_2,m}^{[s]} = \left\lceil \sum_{l=l_1}^{l_2} \frac{\lambda_l^{[s]}}{R_m} \right\rceil$$

to transmit the layers from $l_1$ to $l_2$ with MCS m for each value of m, $l_1$ and $l_2$ for each session s. In addition, by employing the received user-feedback, the base station 102 may further compute the utility $$\mu_{j,l}^{[s]} = U_j^{[s]}\left(\sum_{k=1}^{l} \lambda_k^{[s]}\right)$$

for each user j in each session s if the video layers 1, 2, ..., l are decodable for the user and may further compute the utility $v_{l,m}^{[s]}$ of all the users in set $N_m^{[s]}$ for each session s when they can receive layers 1 to l. Alternatively, if only a single session is considered, these slot and utility values can be computed for only one session.

At optional step 454, the base station 102 may select a factor $\epsilon$ and may compute $\hat{v}$ and K, as discussed above, for example, with respect to Algorithm 2 of Table 6. Here, the base station 102 may select the factor $\epsilon > 0$, compute $\hat{v}$ and obtain the trivial upper bound for the optimal system utility as $SM\hat{v}$. For example, the base station 102 may compute $$\hat{\mathcal{L}}^{[s]}(m) = \max\{l \mid \tau_{1,l,m} \leq T\},$$
$$\tilde{v}^{[s]} = \max_{m=1}^{M} v_{\hat{\mathcal{L}}^{[s]}(m),m}^{[s]},$$
$$\hat{v} = \max_{s=1}^{S} \tilde{v}^{[s]}$$

and may then compute factor $$K = \frac{\varepsilon \hat{v}}{M}.$$

Alternatively, if only a single session is considered, at optional step 454, the base station 102 may select a factor $\epsilon$ and may compute $\hat{v}$ and K, as discussed above, for example, with respect to Algorithm 1 of Table 4, where $$\varepsilon > 0,$$
$$\tilde{v} = \max_{m=1}^{M} v_{L(m),m} \text{ and } K = \frac{\varepsilon \tilde{v}}{M}.$$

At optional step 456, the base station 102 may convert utility values as discussed above, for example, with respect to Algorithm 2 of Table 6. Here, $v_{l,m}^{[s]}$ may be set to $$\left\lceil \frac{v_{l,m}^{[s]}}{K} \right\rceil$$

for use in Recursion 2 for each session s. It should be noted that steps 454 and 456 can be omitted if Recursion 2 of Table 3 in the single session case or Recursion 3 of Table 5 in the multi-session case are only employed or are employed with a different approximation scheme.

At step 458, the base station 102 may compute values for t(l,M,u). As discussed above, t(l,m,u) can correspond to the minimum number of slots utilized for potential MCS assignments where the total system utility for users in the set $\cup_{m'=1}^{m} N_{m'}$ is exactly u, where $u \in \{0, 1, \ldots, M\tilde{v}\}$. For example, in the multi-session scenario, for each $s \in \{1, 2, \ldots, S\}$, the single-session dynamic programming algorithm (Algorithm 1 of Table 4) can be used to compute all the values of t(l,M,u) for $1 \leq l \leq L^{[s]}$ and $$0 \leq u \leq M\left\lfloor \frac{\tilde{v}^{[s]}}{K} \right\rfloor.$$

Alternatively, if only a single session is considered, then the base station 102 can compute all the values of t(l,M,u) for $1 \leq l \leq L$ and $$0 \leq u \leq M\left\lfloor \frac{\tilde{v}}{K} \right\rfloor.$$

Further, if a fully polynomial time approximation scheme is not employed, then $\tilde{v}^{[s]}$ and $\hat{v}$ can be employed in place of $$\left\lfloor \frac{\tilde{v}^{[s]}}{K} \right\rfloor \text{ and } \left\lfloor \frac{\tilde{v}}{K} \right\rfloor,$$

respectively, as discussed above with respect to recursions 3 and 2.

At step 458a, to compute values for t(l,m,u), the base station 102 may compute the initial conditions for t(l,m,u) and q(l,m,u), which is described in detail below. For example, as discussed above with respect to Recursion 2, the set of initial conditions may be defined as follows: t(0,m,0)=0 for all $m \leq 0$, t(0,m,u)=$\infty$ for all $m \geq 0$ and $0 \leq u \leq M\tilde{v}$ (where $\tilde{v}$ can be replaced with $\tilde{v}^{[s]}$, $$\left\lfloor \frac{\tilde{v}}{K} \right\rfloor \text{ or } \left\lfloor \frac{\tilde{v}^{[s]}}{K} \right\rfloor\right),$$

t(l,0,u)=$\infty$ for all $l \leq 1$ and $0 \leq u \leq M\tilde{v}$ (where $\tilde{v}$ can be replaced with $\tilde{v}^{[s]}$, $$\left\lfloor \frac{\tilde{v}}{K} \right\rfloor \text{ or } \left\lfloor \frac{\tilde{v}^{[s]}}{K} \right\rfloor\right),$$

and t(l,m,u)=$\infty$ for all l, $m \geq 0$ and u<0. Finally, q(0,m,u)=0 for all $m \geq 0$, $u \geq 0$.

At step 458b, the base station 102 may recursively determine values of the minimum number of slots utilized for potential assignments based on the initial conditions and on the received feedback. For example, as discussed above with respect to Recursion 2, the base station 102 may recursively determine $t(l,m,u)=\min_{\delta=0}^{l}(t(l-\delta,m-1,u-v_{l,m})+\tau_{l-\delta+1,l,m})$, for all $1 \leq l \leq L$, $1 \leq m \leq M$, and $0 \leq u \leq M\tilde{v}$ (where $\tilde{v}$ can be replaced with $\tilde{v}^{[s]}$, $$\left\lfloor \frac{\tilde{v}}{K} \right\rfloor \text{ or } \left\lfloor \frac{\tilde{v}^{[s]}}{K} \right\rfloor$$

and L can be replaced with $L^{[s]}$). Similar to the discussion provided above with respect to step 356, as indicated by the factor $\tau_{l-\delta+1,l,m}$, data from different layers (i.e. layers within the set $l-\delta+1$ to l) correlated to a common MCS, m, in an assignment can be allocated a common slot.

In addition, it should be noted that a recursive determination step for a particular MCS determines a minimal number of slots for a particular layer index such that the recursive determination step for the particular MCS is constrained to assign to the particular MCS a block of layer indices commencing from the particular layer index. For example, for MCS m, the recursion step assigns m a block of layers $l-\delta+1$ to l, with $0 \leq \delta \leq l$, commencing from l. Moreover, the recursion step for MCS m recursively determines corresponding values of minimum number of slots for the particular layer index l by successively expanding the block until the lowest index for the set of layers is processed. For example, by successively varying $\delta$ from 0 to l, the block of layers commencing from l is expanded until the lowest layer index, 0 or 1, is reached.

Further, a recursive determination step for a particular MCS determines values of minimum numbers of slots utilized by allocating the particular MCS to a particular layer index to achieve each utility value within a pre-determined set of utility values. For example, as noted above, $t(l,m,u)=\min_{\delta=0}^{l}(t(l-\delta,m-1,u-v_{l,m})+\tau_{l-\delta+1,l,m})$ can be determined for utility values u, where u is within the set $0 \leq u \leq M\tilde{v}$ (where $\tilde{v}$ can be replaced with $\tilde{v}^{[s]}$, $$\left\lfloor \frac{\tilde{v}}{K} \right\rfloor \text{ or } \left\lfloor \frac{\tilde{v}^{[s]}}{K} \right\rfloor).$$

In addition, the recursive determination step for $t(l,m,u)$ is based on the utility $v_{l,m}$, which denotes the maximum utility achievable by all users in the set $N_m$, which are capable of utilizing MCSs only up to MCS m when they can receive or process layers 1 to l. As discussed above with respect to Algorithm 1 of Table 1, $v_{l,m}$ can be replaced with $v_{l,m}/K$, where $K=\epsilon \tilde{v}/M$. It should be noted that a fully polynomial time approximation scheme produces a solution that is within a factor $\epsilon>0$ of being optimal. Accordingly, here, $\epsilon$ is a pre-determined factor within which the values of the minimum number of slots $t(l,m,u)$ obtained are optimal.

To permit the assignments of MCS to layers, as discussed further herein below while recursively determining the utility values $t(l,m,u)$ at step 458b, the base station 102 can record the number of layers modulated with MCS m to achieve the minimum number of resources $t(l,m,u)$ employed by users that can employ MCSs with indices that are at most m or lower $(\cup_{m'=1}^{m} N_{m'})$, can achieve utility u, and can receive at most layers of index l or lower. This number of layers is denoted here as $q(l,m,u)$ and the base station can compute $q(l,m,u)$ for each corresponding computation of $t(l,m,u)$ as follows: $q(l,m,u)=\arg\min_{\delta=0}^{l}(t(l-\delta, m-1, u-v_{l,m})+\tau_{l-\delta+1,l,m})$, for all $1 \leq l \leq L$, $1 \leq m \leq M$, and $0 \leq u \leq M\tilde{v}$. In other words, $q(l,m,u)$ corresponds to the length of the block of layers $l-\delta+1$ to l corresponding to the minimum number of slots $t(l,m,u)$. Furthermore, $q(l,m,u)$ can be computed for each possible triplet of l, m and u, where $1 \leq l \leq L$, $1 \leq m \leq M$, and $0 \leq u \leq M\tilde{v}$. As stated above, $\tilde{v}$ can be replaced with $\tilde{v}^{[s]}$, $$\left\lfloor \frac{\tilde{v}}{K} \right\rfloor \text{ or } \left\lfloor \frac{\tilde{v}^{[s]}}{K} \right\rfloor,$$

L can be replaced with $L^{[s]}$, and $v_{l,m}$ can be replaced with $v_{l,m}/K$ in various exemplary embodiments.

At optional step 460, the base station 102 can compute $h(S,u)$ using a multi-session dynamic programming process if multiple sessions are considered. For example, the base station 102 can use the multi-session dynamic programming algorithm (Algorithm 2 of Table 6) to compute all the values of $h(S,u)$ for $$0 \leq u \leq SM\left\lfloor \frac{\tilde{v}}{K} \right\rfloor.$$

Alternatively, the base station 102 can use Recursion 3 of Table 5 to compute all the values of $h(S,u)$ for $0 \leq u \leq SM\tilde{v}$), if the fully polynomial time approximation scheme is not employed.

At step 460a, to compute values for $h(s,u)$, as discussed above with respect to Recursion 3 of Table 5, the base station 102 may pre-compute $\tilde{t}^{[s]}(u)$, which is the minimum number of slots needed when the utility of session s is exactly u: $\tilde{t}^{[s]}(u)=\min_{l=1}^{L^{[s]}}(t(l,M,u), 0 \leq u \leq M\tilde{v}^{[s]})$.

At step 460b, the base station 102 can compute another set of initial conditions for the minimum number of slots utilized in the multi-session scenario. For example, as discussed above with regard to Recursion 3 of Table 5, the minimum number of slots needed for achieving utility u with video session 1 can be computed:

$$h(1, u) = \begin{cases} \tilde{t}^{[1]}(u), & \text{if } 0 \leq u \leq M\tilde{v}^{[1]} \\ +\infty, & \text{otherwise} \end{cases}.$$

As discussed above, $\tilde{v}^{[1]}$ can be replaced with $\tilde{v}^{[1]}/K$ in various exemplary embodiments.

Further, it should also be noted that, to permit the assignment of MCSs to layers of one or more sessions, the base station 102 can compute the initial condition for another function, $g(s,u)$. Here, $g(s,u)$ denotes the utility provided by session s corresponding to the minimum number of slots employed by sessions 1 to s to achieve the utility u provided by sessions 1 to s. The initial condition for $g(s,u)$ is as follows $g(1,u)=u$ for $0 \leq u \leq M\tilde{v}^{[1]}$ or $0 \leq u \leq M\tilde{v}^{[1]}/K$.

At step 460c, the base station 102 can recursively determine values of the minimum number of slots utilized for each successively incremented session and for each utility value within a set of pre-determined utility values based on the set of initial conditions. For example, as discussed above with respect to Recursion 3 of Table 5, the base station 102 can compute the minimum number of slots needed to achieve the exact utility u with video sessions 1 to ($1 < s \leq S$), where S is the total number of sessions: $h(s,u)=\min_{u'=0}^{\min\{u,M\tilde{v}^{[s]}\}}(h(s-1,u-u')+\tilde{t}^{[s]}(u'))$, for all $2 < s \leq S$, $0 \leq u \leq SM\hat{v}$; Here, for each set of sessions 1 to s and each utility value u, the sum $h(s-1, u-u')+\tilde{t}^{[s]}(u')$ is recursively determined for $u'=0$ to the minimum of u or $M\tilde{v}^{[s]}$. In other words, the recursive determination of sums for a set of sessions 1 to s and utility value u ends when $u'=u$ or when $u'=M\tilde{v}^{[s]}$ is reached. Thus, the recursive determination of sums for the particular set of sessions 1 to s is bounded by $M\tilde{v}^{[s]}$. As noted above, $\tilde{v}^{[s]}$ can correspond to the maximum utility achievable by the receiver devices in the session s. After the recursive determination of sums for a set of sessions 1 to s and utility value u(h(s,u)) is completed, as indicated in the recursion for h(s,u), the base station 102 can select the minimum value of sums obtained as the minimum number of slots needed to achieve the exact utility u with video sessions 1 to s. The recursion can continue successively for each s until h(S,u) for each u, $0 \leq u \leq SM\hat{v}$, is determined.

Moreover, to permit the base station to determine MCS assignments, the base station 102 can recursively compute and record g(s,u) at step 460c during the computation of h(s,u). For example, the base station 102 can compute and record the following:

$$g(s,u)=\arg\min_{u'=0}^{\min\{u,M\tilde{v}^{[s]}\}}(h(s-1,u-u')+\tilde{t}^{[s]}(u')), \text{ for all } 2<s\leq S, 0\leq u\leq SM\hat{v}.$$

As noted above, g(s,u) denotes the utility (u') provided by session s corresponding to the minimum number of slots (h(s,u)) employed by sessions 1 to s to achieve the utility u provided by sessions 1 to s. As discussed further herein below with regard to step 406, the term g(s,u) is employed to determine the number of layers utilized in the session s and thereby recursively determine the highest layer index assigned to each MCS used in session s.

It should also be noted that step 460c can optionally be implemented in accordance with Algorithm 2 of Table 6. For example, $v_{l,m}^{[s]}$ may be set to $$\left\lceil \frac{v_{l,m}^{[s]}}{K} \right\rceil$$

and the range of utilities evaluated to compute t(l,M,u) in Recursion 2 can be set to $0 \leq u \leq M\lfloor \tilde{v}^{[s]}/K \rfloor$. Further, the range of utilities evaluated to compute all the values of h(s,u) and g(s,u) can be set to $0 \leq u \leq SM\lfloor \hat{v}/K \rfloor$.

At step 462, the base station 102 can compute the maximum system utility U*. For example, as discussed above, the maximum system utility can be computed in the multi-session scenario by determining $U^*=\max[\{u|h(S,u)\leq T\}]$. Alternatively, if only the single session scenario is considered, the maximum system utility can be computed by determining $U^*=\max\{u|t(l,M,u)\leq T, 1\leq l\leq L\}$.

At step 406, the base station 102 can select the MCS/layer assignments based on the maximum system utility U* obtained at step 404 and can schedule multicast data transmission for each video session. For example, in the multi-session scenario, the base station 102 can compute the utility G(s) provided by each session s to achieve the maximum utility U*, where $G(s)=g(s,U^*-\Sigma_{s'=s+1}^{S}G(s'))$ for all $1 \leq s \leq S$. Here, G(s) can be recursively determined for all $1 \leq s \leq S$ by using g(S,U*) as the initial condition, the value of which is determined at step 460c. The term $U^*-\Sigma_{s'=s+1}^{S}G(s')$ denotes the utility (u) provided by sessions 1 to s to achieve the maximum utility U* and, for each s, the base station 102 recursively determines the utility u' provided by the session s to achieve the maximum utility U* by using g(s,u) determined at step 460c.

After obtaining the utility G(s) provided by session s to achieve the maximum utility U*, the base station 102 can thereafter determine, for each session s, the highest layer index allocated to each MCS m to achieve utility G(s) and thereby determine the MCS assignments. For example, let $L^{[s]}(M)$ denote the highest layer index, which is assigned to the highest MCS index M used in session s in accordance with Lemma 1. The base station 102 can determine the highest layer index $L^{[s]}(M)$ by selecting the index l corresponding to the minimum number of slots employed to achieve the utility G(s) provided by session s: $L^{[s]}(M)=\arg\min_{l=1}^{L^{[s]}}t(l,M,G(s))$. As noted above, all values t(l,m,u) have been computed at step 458b. Thereafter, the base station 102 can recursively determine the highest layer index $L^{[s]}(m)$ allocated to MCS m to achieve the utility G(s) provided by session s starting from $L^{[s]}(M)$ as the initial condition as follows:

$$L^{[s]}(m-1) = L^{[s]}(m) - q\left(L^{[s]}(m), m, G(s) - \sum_{c=m+1}^{M} v_{L(c),c}^{[s]}\right)$$

for all m=M, M−1, ..., 2. As indicated above, the term $q(L^{[s]}(m),m,u)$ denotes the number of consecutive layer indices ($\delta$) from layer index $L^{[s]}(m)$ that is allocated to MCS m when the users $\cup_{m'=1}^{m} N_{m'}$ provide utility u. The term $$G(s) - \sum_{c=m+1}^{M} v_{L(c),c}^{[s]}$$

denotes this utility, as it accounts for the utility provided by users that can employ MCSs with indices that are at most higher than m and subtracts this utility from the utility G(s) provided by the session s, thereby indicating the utility provided by the remaining users $\cup_{m'=1}^{m} N_{m'}$.

Similar to the MCS assignments determined in accordance with the optimal approach in step 308, the MCS assignments can be made by assigning an MCS m to layer indices layers between the MCS m's highest layer index $L^{[s]}(m)$ and the highest layer index below $L^{[s]}(m)$ that is allocated to another MCS: $M^{[s]}(l)=\infty$, for all $l > L^{[s]}(M)$, $1 \leq s \leq S$; and $M^{[s]}(l)=m$, for all $L^{[s]}(m-1)<l<L^{[s]}(m)$, $1 \leq s \leq S$.

For the single session scenario, the base station 102 can determine MCS assignments in the same manner as in the multi-session case except that the maximum system utility U* is given by $U^*=\max\{u|t(l,M,u)\leq T, 1 \leq l \leq L\}$, and the term G(s) is replaced with this maximum utility U* in the expressions for $L^{[s]}(m)$ and $L^{[s]}(m-1)$.

Returning to FIG. 2, upon completion of the application of a resource allocation scheme using adaptive modulation at step 204, the base station 102, at step 206, can transmit multicast data in accordance with the MCS/layer assignments and the schedule determined at step 204.

Figure 5:
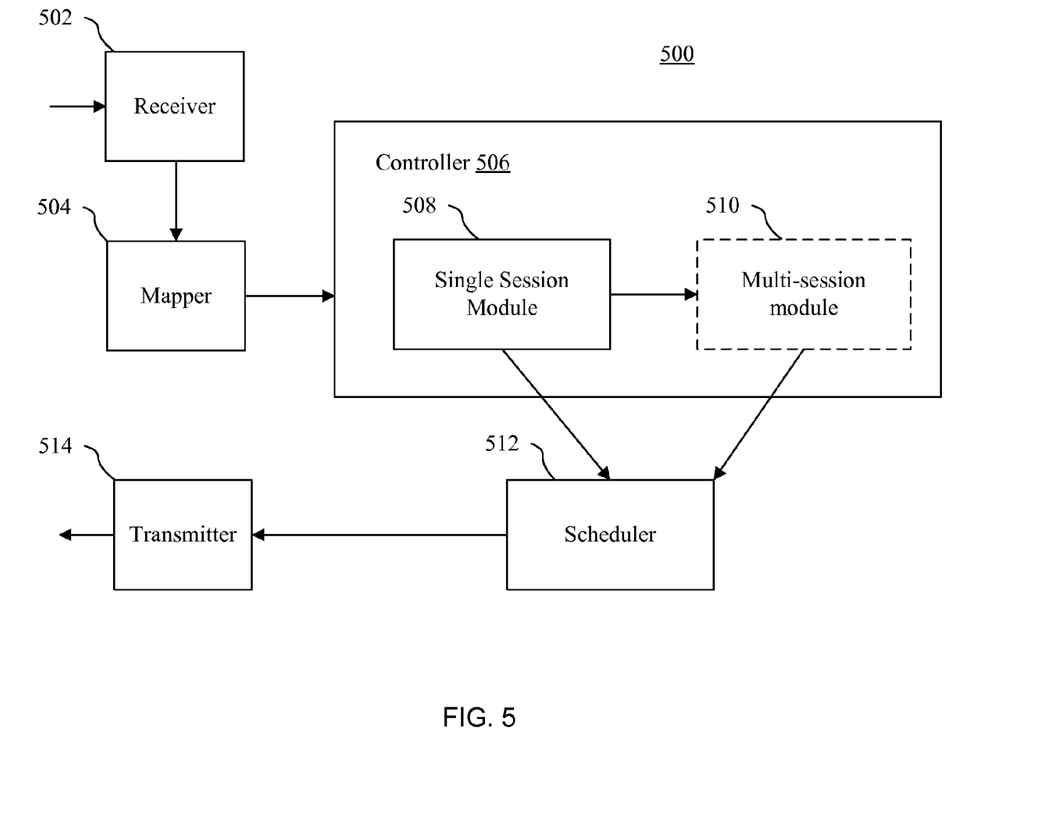
FIG. 5 is a block/flow diagram of a system for assigning modulation and coding schemes and allocating resources to layers of a data stream for transmission over a wireless network in accordance with an exemplary embodiment of the present invention.

Referring now to FIG. 5 with continuing reference to FIGS. 2-4, an exemplary system 500 that can be implemented in the base station 102 in accordance with exemplary embodiments of the present invention is illustrated. System 500 may include a receiver 502 that can be configured to receive user feedback and/or input data streams and may further include a transmitter 514 configured to performed multicast data transmission in accordance with MCS assignments determined by an optimal process and/or an approximation scheme, as discussed above. In particular, the receiver 502 can be configured to perform steps 202, 252 and 254 under the control of controller 506, while the transmitter 514 can be configured to perform step 206 under the control of controller 506. Further, using the mapper 504 and/or the scheduler 512, the controller can direct the performance of steps 252, 256 and 258. For example, the mapper 504 can be configured to compute MCS mapping to the set of users serviced by the system 500 as discussed above, for example, with respect to steps 302 and 402. In addition, the controller 506 can include a single session module 508 and an optional multi-session module 510. For example, the single session module 508 can be configured to determine maximum utilities to assign MCS for the layers in each session using the optimal single-session process, as discussed above with respect to step 304. Alternatively or additionally, the single session module 508 can be configured to aid the controller 506 in determining the maximum system utility to allocate resources and to assign MCS for the layers in each session using one or more of approximation processes, as discussed above, for example, with respect to step 404. For example, the single session module can be configured to perform any one or more of steps 452-458 and 462. Further, if multiple sessions are considered, the optional multi-session module 510 can be configured to perform any one or more of step 306 and steps 460-462. The system 500 may also include a scheduler 512 that can be configured to select MCS assignments and schedule multicast data transmission for each video session. For example, the schedule 512 can be configured to perform step 308 and/or step 406.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Having described preferred embodiments of a methods and systems for allocating resources and assigning MCSs to layers of a data stream (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for transmitting layers of a data stream over wireless resources partitioned into slots comprising:
   receiving feedback indicating channel state information from a set of receiver devices;
   determining a maximal utility for the set of receiver devices based on the received feedback by determining values of the minimum number of slots utilized for potential assignments of a set of modulation and coding schemes (MCSs) to a set of layers to achieve the maximal utility such that data from different layers correlated to a common modulation and coding scheme (MCS) in an assignment is allocated a common resource slot;
   selecting MCS assignments based on the maximal utility; and
   transmitting the set of layers to the set of receiver devices in accordance with the selected MCS assignments.

2. The method of claim 1, wherein said determining further comprises:
   pre-determining a set of initial conditions for the utilities of potential assignments; and
   recursively determining the utilities of potential assignments based on the initial conditions and on the received feedback.

3. The method of claim 2,
   wherein the layers in the set of layers and the MCSs are independently indexed with integers such that any layer with an index that is higher than an index of an other layer is associated with a data rate that is higher than a data rate associated with the other layer and any MCS with an index that is higher than an index of an other MCS is associated with a data rate that is higher than a data rate associated with the other MCS, and
   wherein a recursive determination step for a particular MCS determines a maximum utility for a particular layer index such that the recursive determination step for the particular MCS is constrained to assign to the particular MCS a block of layer indices commencing from the particular layer index and recursively determines corresponding utilities for the particular layer index by successively expanding the block until the lowest index for the set of layers is processed.

4. The method of claim 3, wherein utility values obtained in the recursive determination of corresponding utilities for the particular layer index are based on utilities determined in a previous recursive determination step for an MCS preceding the particular MCS.

5. The method of claim 3, wherein a recursive determination step for a particular MCS is repeated for each possible layer index.

6. The method of claim 3, wherein the determining a maximal utility for the set of receiver devices further comprises:

for each MCS, pre-computing a number of slots for layer transmission for each potential assignment of blocks of layer indices to a common MCS.

7. The method of claim 3,
wherein the determining a maximal utility for the set of receiver devices further comprises recording the lengths of the blocks corresponding to the maximum utility for each particular layer index and MCS pair; and
wherein the selecting further comprises a) determining the highest layer index corresponding to the highest MCS with which the maximal utility is achieved by the set of receiver devices, b) from the highest layer index corresponding to the highest MCS, recursively determining the highest layer indices allocated to each MCS to achieve the maximal utility based on the recorded lengths of blocks and c) assigning MCSs to layers based on the highest layer indices.

8. The method of claim 1, wherein the set of layers correspond to multiple sessions, each session servicing a subset of said set of receiver devices, and wherein the determining is repeated for different sessions and wherein the method further comprises:
performing an inter-session resource allocation process that is based on maximal utilities determined for each session to select the MCS assignments.

9. The method of claim 1, wherein said determining a maximal utility further comprises:
pre-determining a set of initial conditions for the minimum number of slots utilized for potential assignments; and
recursively determining values of the minimum number of slots utilized for potential assignments based on the initial conditions and on the received feedback.

10. The method of claim 9,
wherein the layers in the set of layers and the MCSs are independently indexed with integers such that any layer with an index that is higher than an index of an other layer is associated with a data rate that is higher than a data rate associated with the other layer and any MCS with an index that is higher than an index of an other MCS is associated with a data rate that is higher than a data rate associated with the other MCS, and
wherein a recursive determination step for a particular MCS determines a value of a minimum number of slots utilized by allocating the particular MCS to a particular layer index to achieve a particular utility value such that the recursive determination step for the particular MCS is constrained to assign to the particular MCS a block of layer indices commencing from the particular layer index and recursively determines corresponding values of a number of slots utilized for the particular layer index by successively expanding the block until the lowest index for the set of layers is processed.

11. The method of claim 10, wherein the recursive determination step for the particular MCS determines values of minimum numbers of slots utilized by allocating the particular MCS to the particular layer index to achieve each utility value within a pre-determined set of utility values and is based on the utility achievable by the receiver devices which are capable of utilizing only the particular MCS and any MCSs with indices lower than the particular MCS index and of processing only layers including the particular layer index and any layers with indices below the particular layer index.

12. The method of claim 11, wherein the utility achievable by the receiver devices is modified with a parameter that is based on a pre-determined factor within which the values of the minimum number of slots are optimal and is based on the highest MCS index.

13. The method of claim 11,
wherein the determining a maximal utility further comprises recording the lengths of the blocks corresponding to the minimum number of slots for each particular layer index and MCS pair; and
wherein the selecting further comprises a) determining the highest layer index corresponding to the highest MCS with which the maximal utility is achieved by the set of receiver devices, b) from the highest layer index corresponding to the highest MCS, recursively determining the highest layer indices allocated to each MCS to achieve the maximal utility based on the recorded lengths of blocks, and c) assigning MCS to layers based on the highest layer indices.

14. The method of claim 11, wherein the set of layers correspond to multiple sessions, each session servicing a subset of said set of receiver devices, and wherein the determining a maximal utility further comprises:
determining a second set of initial conditions for the minimum number of slots utilized for multiple sessions; and
recursively determining values of the minimum number of slots utilized for each successive incrementally expanded set of sessions and for each utility value within a second set of pre-determined utility values based on the second set of initial conditions until a total number of sessions is reached.

15. The method of claim 14, wherein the sessions are indexed with consecutive integers and wherein a recursive determination step for a particular set of sessions and for a particular utility value within the second set of utility values recursively determines sums of the minimum number of slots for a session corresponding to a highest index in the particular set of sessions and the minimum number of slots utilized for a previously evaluated set of sessions and selects the minimum value of the recursively determined sums as the minimum number of slots utilized for the particular set of sessions.

16. The method of claim 15, wherein the recursive determination of sums for the particular set of sessions is bounded by a parameter that is based on the maximum utility achievable by the receiver devices in the session corresponding to the highest index in the particular set of sessions.

17. The method of claim 16, wherein the determining a maximal utility for the set of receiver devices includes selecting as the maximal utility the maximum utility value corresponding to a value of the minimum number of slots utilized by all sessions.

18. The method of claim 17,
wherein the determining a maximal utility further comprises recording, for each particular session, the utility provided by the particular session corresponding to the minimum number of slots employed by sessions with indices at or less than the index of the particular session to achieve a utility, provided by sessions with indices at or less than the index of the particular session, within the second set of pre-determined utility values, and
wherein the selecting MCS assignments is based on the recorded utilities.

19. A system for transmitting layers of a data stream over wireless resources partitioned into slots comprising:
a receiver configured to receive feedback indicating channel state information from a set of receiver devices;
a controller configured to determine a maximal utility for the set of receiver devices based on the received feedback by determining values of the minimum number of slots utilized for potential assignments of a set of modulation and coding schemes (MCSs) to a set of layers to achieve the maximal utility such that data from different layers correlated to a common modulation and coding scheme (MCS) in an assignment is allocated a common resource slot;

a scheduler configured to select MCS assignments based on the maximal utility; and a transmitter configured to transmit the set of layers to the set of receiver devices in accordance with the selected MCS assignments.

* * * * *